Sept. 26, 1933.       P. D'H. DRESSLER       1,928,415
FUEL TREATING APPARATUS
Original Filed June 15, 1925    7 Sheets-Sheet 3
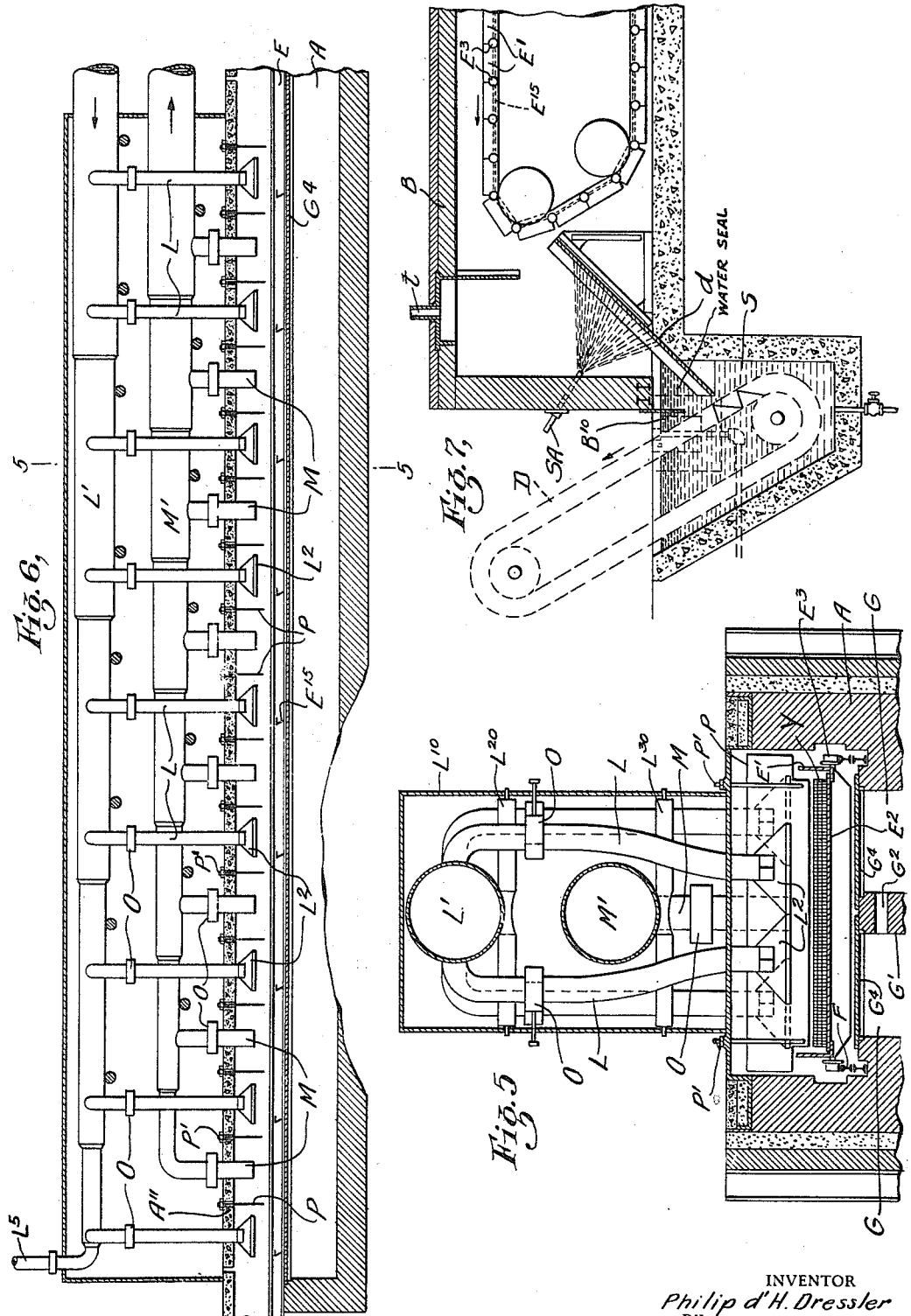

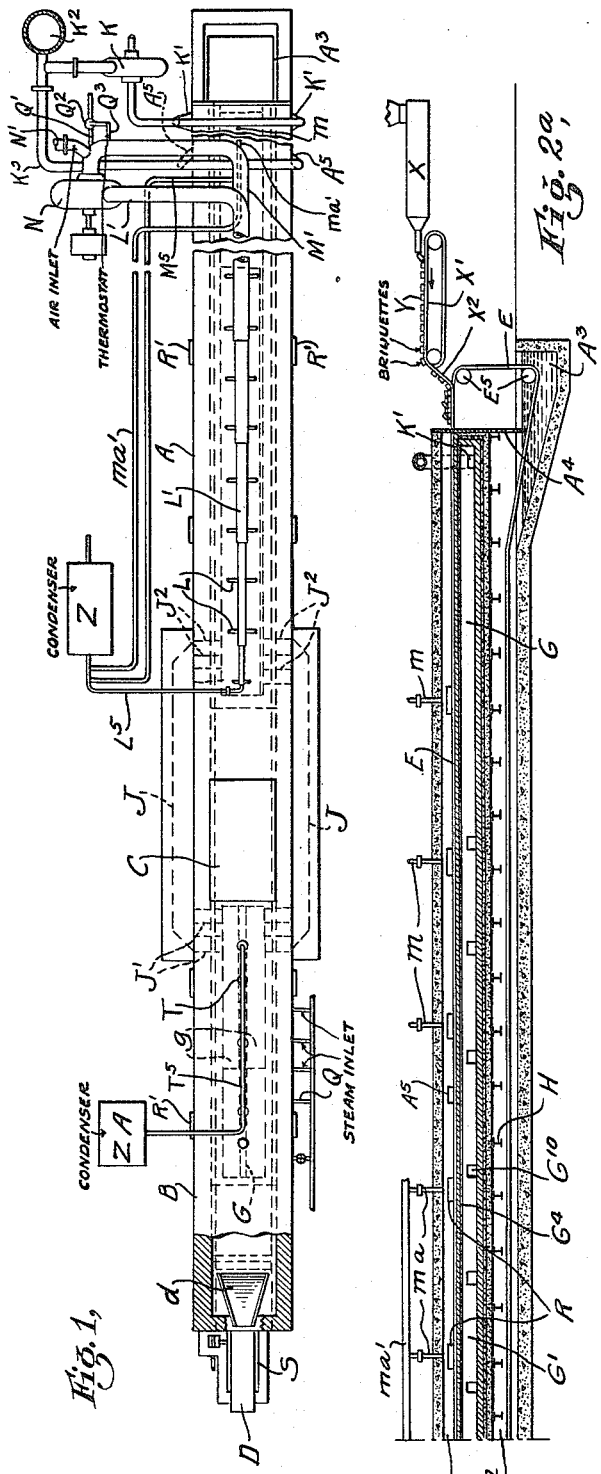
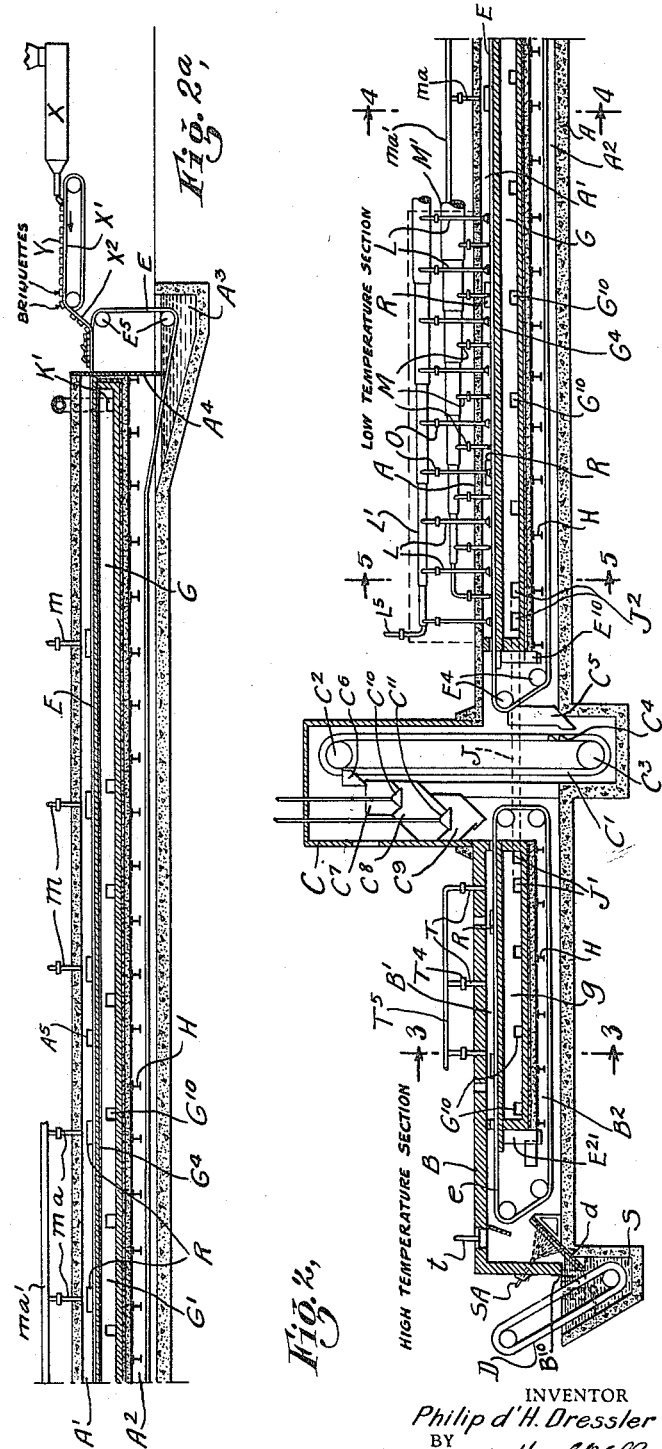

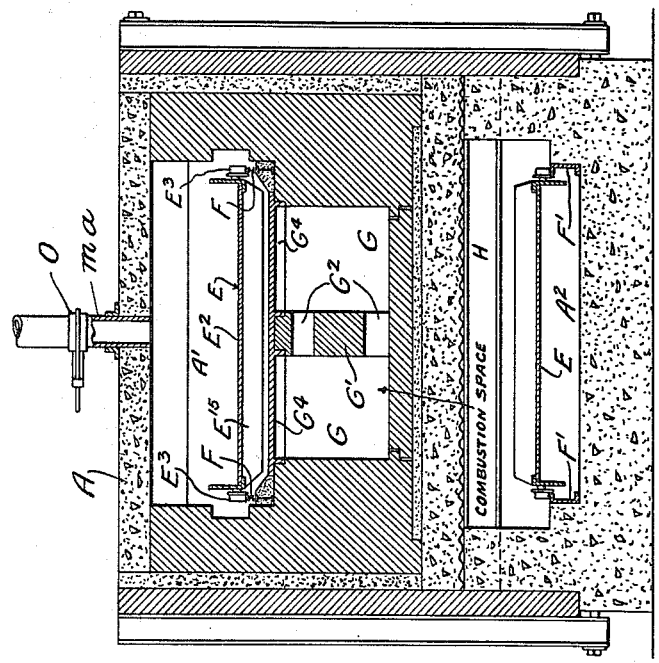
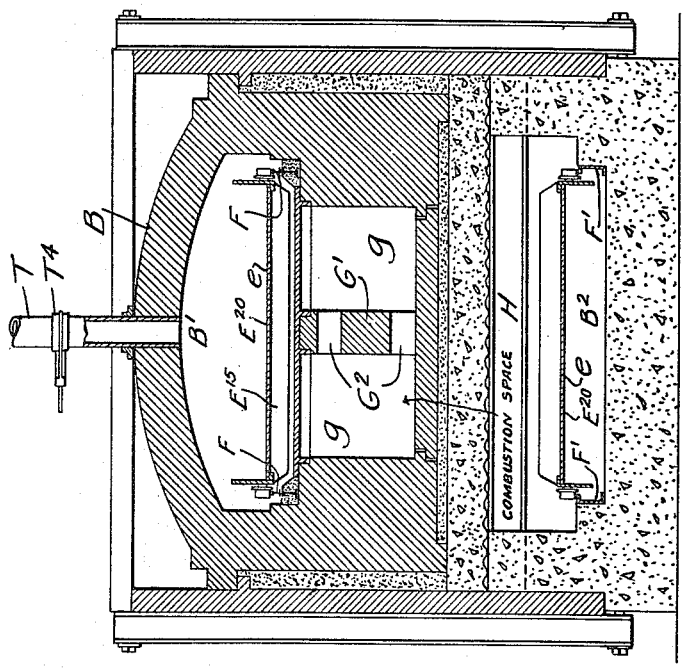

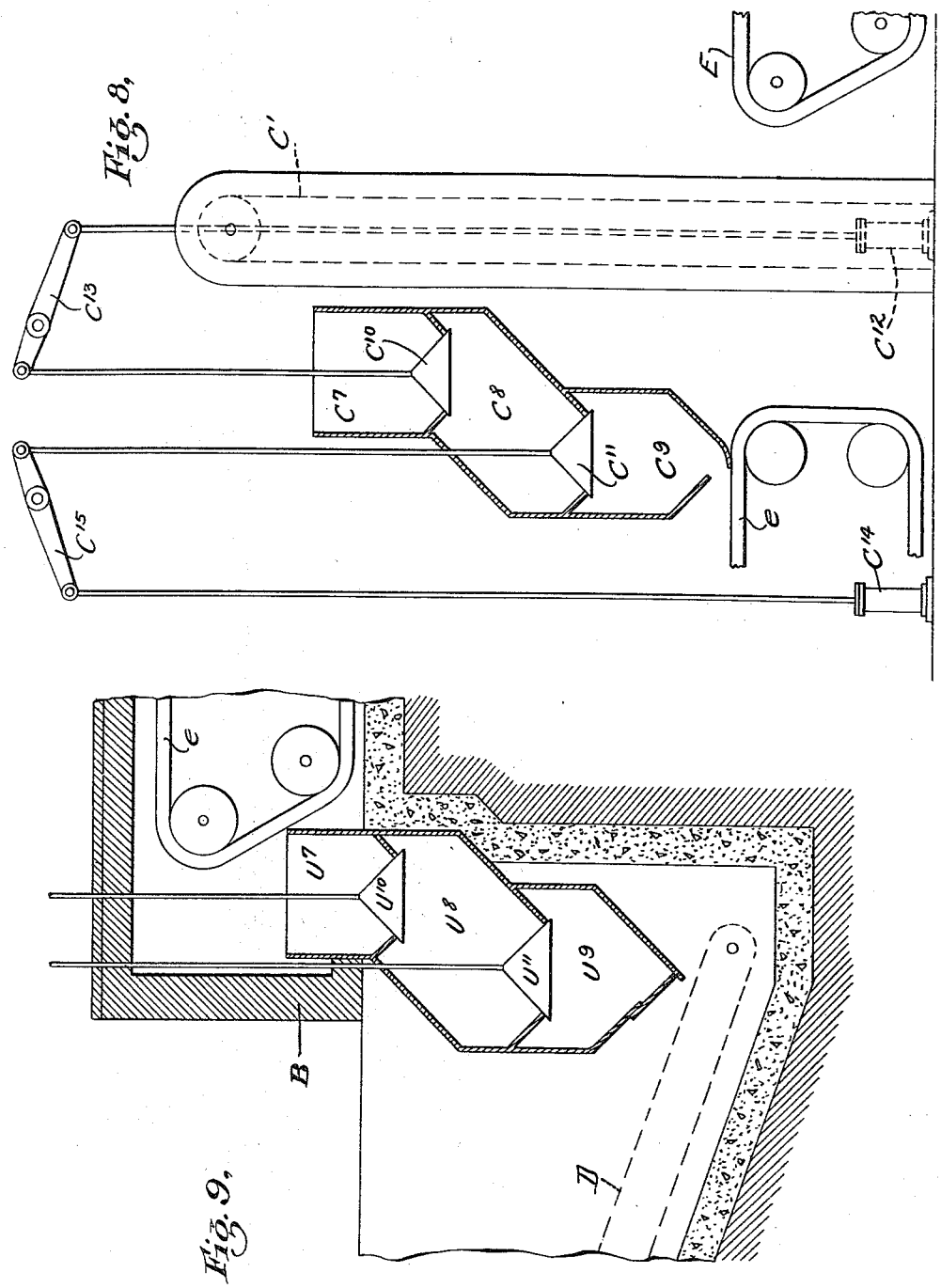

Sept. 26, 1933.   P. D'H. DRESSLER   1,928,415
FUEL TREATING APPARATUS
Original Filed June 15, 1925   7 Sheets-Sheet 5
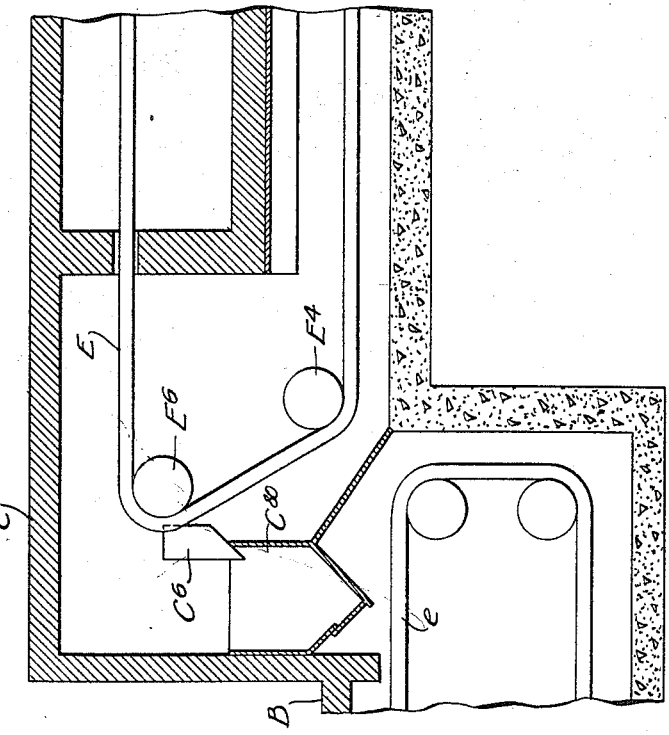
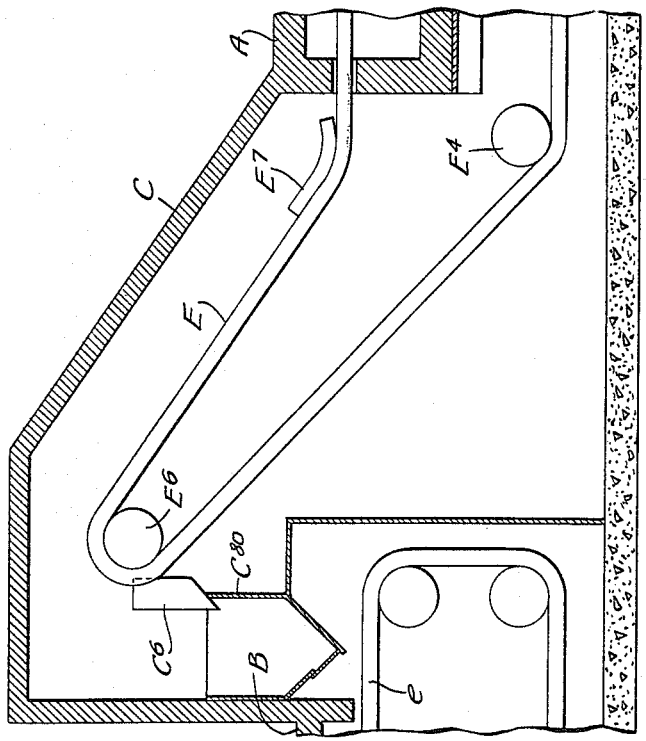
INVENTOR
Philip d'H. Dressler
BY
John E. Hubbell
ATTORNEY

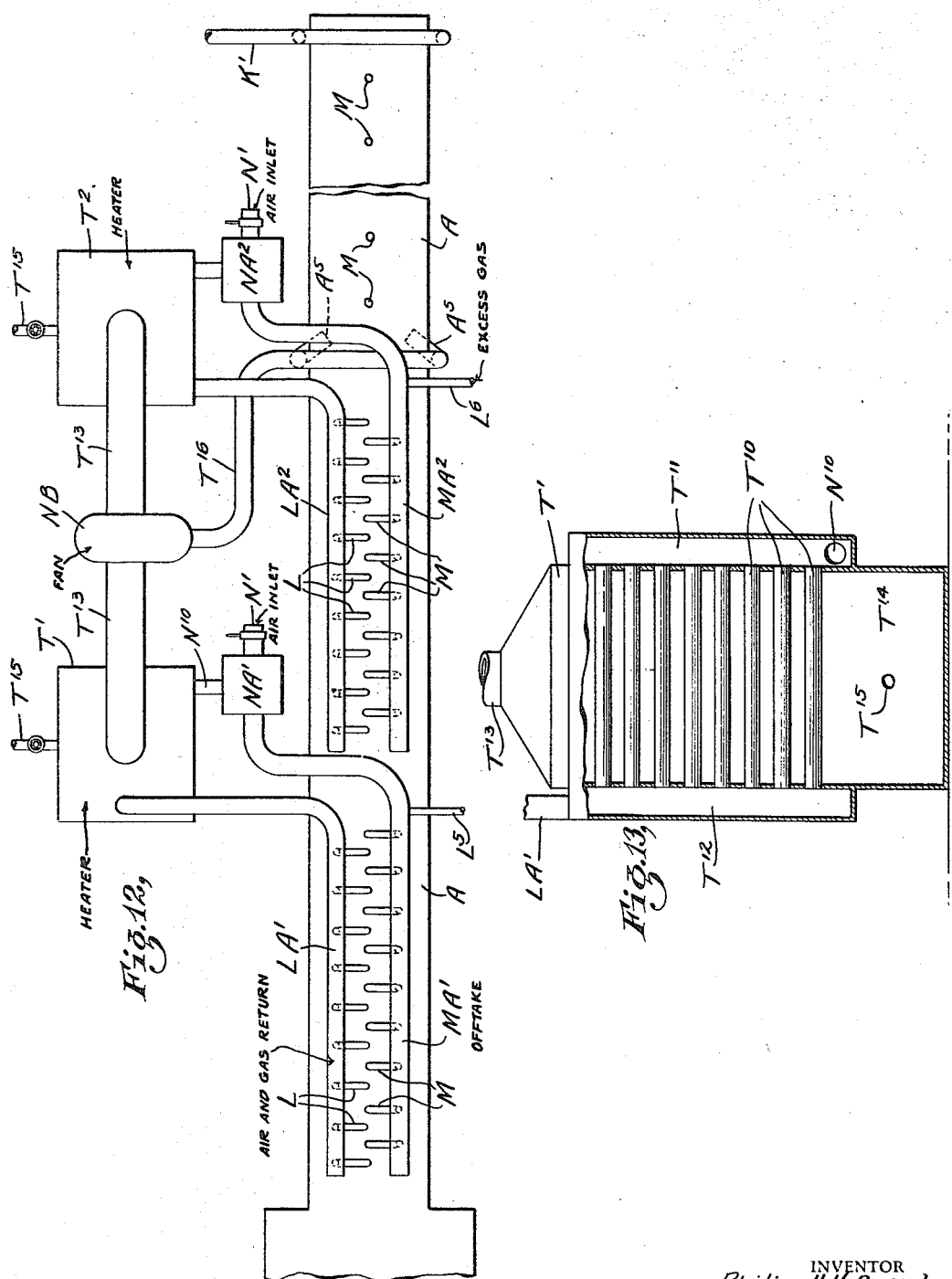

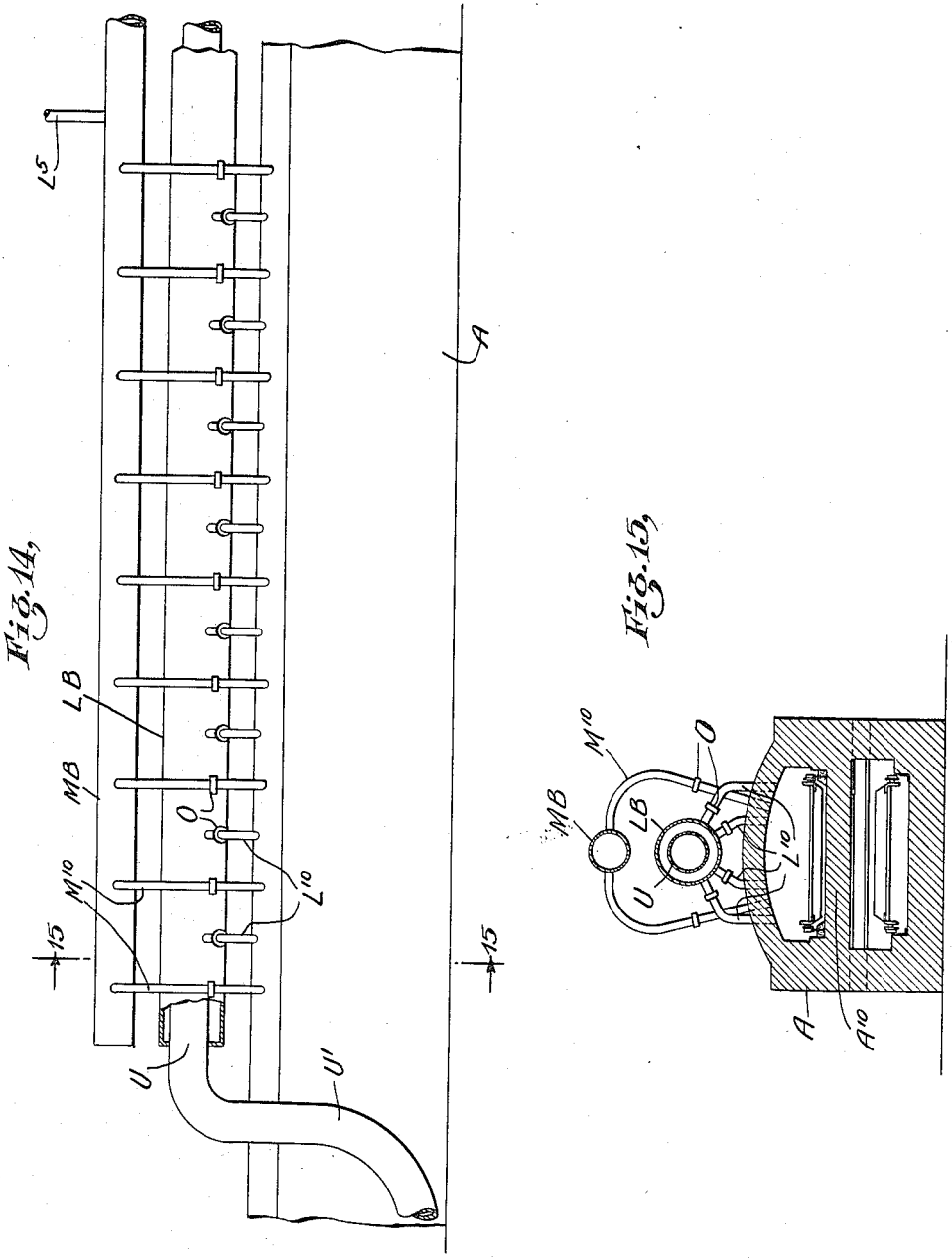

Patented Sept. 26, 1933

1,928,415

UNITED STATES PATENT OFFICE 1,928,415

FUEL TREATING APPARATUS

Philip d' Huc Dressler, Cleveland, Ohio, assignor, by mesne assignments, to Swindell-Dressler Corporation, Pittsburgh, Pa., a corporation of Pennsylvania Original application June 15, 1925, Serial No. 37,077. Divided and this application May 22, 1928. Serial No. 279,686

7 Claims. (Cl. 202—117)

The general object of the present invention is to provide improvements in the construction and arrangement of kilns or retorts for continuously subjecting material to heat treatments under predetermined kiln temperature and kiln atmosphere conditions. More specifically, the object of the invention is to provide an improved form of continuous kiln or retort for the effective and economical treatment of plastic blocks or briquettes formed from an oil and water wet mass of finely divided coal to give such briquettes the mechanical hardness and strength required to enable them to stand transportation, and in some cases to eliminate volatile smoke forming constituents so that the briquettes will burn with practically smokeless combustion.

The apparatus was primarily devised and is especially adapted for use in the manufacture of fuel from the material which is not inappropriately called "coal amalgam". Coal amalgam is formed in a known process of treating coal to eliminate or reduce the mineral ash forming constituents originally admixed with the coal. The method of coal purification resulting in the production of coal amalgam ordinarily involves the production of a water wet mass of finely ground coal, and the intimate mixture with this mass of a suitable oil or oil mixture having an affinity for carbon in the form of finely ground coal, but not for the mineral ash forming constituents of the coal. This method of purifying coal is well adapted for the production of fuel having a satisfactory small ash content from a coal which like Rhode Island anthracite, contains such a large percentage of ash forming constituents as to be practically incombustible in its natural state.

The apparatus forming the present invention is characterized in general by the provisions made for minmizing the labor and attendance required in the operation of a kiln of desirably large capacity for drying and hardening briquettes, and if need be for eliminating smoke forming constituents therefrom, in the manner described; and comprises various novel features of construction and arrangement designed with this end in view. The invention is further characterized by the provisions made for subjecting the briquettes to a vigorous oxidizing action at the time when such action is required with the use of a relatively small amount of air which serves as the oxidizing agent and by minimizing the required amount of which, I avoid the heat losses, and the dilution of the distillates which would be experienced if more air were employed.

The various features of novelty which characterize my invention are pointed out with particularity in the claims annexed to and forming a part of this specification; but for a better understanding of the invention, its advantages and specific objects attained with its use, reference should be had to the accompanying drawings and descriptive matter in which I have illustrated and described preferred embodiments of my invention.

Of the drawings:

Fig. 1 is a somewhat diagrammatic plan view of a preferred embodiment of my invention;

Fig. 2 is a longitudinal section of one portion, and

Fig. 2a is a longitudinal section of the remainder of the apparatus shown in Fig. 1;

Figs. 3 and 4 are transverse sections on the lines 3—3 and 4—4, respectively, of Fig. 2;

Fig. 5 is a transverse section on the line 5—5 of Fig. 6;

Fig. 6 is a longitudinal section taken similarly to Fig. 2 but on a larger scale and showing only a portion of the apparatus shown in Fig. 2;

Fig. 7 is an enlarged section taken similarly to Fig. 2 of the discharge end of the apparatus shown in Figs. 1 and 2;

Fig. 8 is a side elevation of a portion of the transfer apparatus shown in Figs. 1 and 2;

Fig. 9 is a sectional elevation illustrating a modification of the portion of the apparatus shown in Fig. 7;

Fig. 10 is a sectional elevation illustrating a modified form of the transfer section of the kiln;

Fig. 11 is a view taken similarly to Fig. 10 and illustrating a second modification of the transfer section;

Fig. 12 is a somewhat diagrammatic plan view illustrating a modified kiln heating system;

Fig. 13 is a sectional elevation of a heater employed in Fig. 12;

Fig. 14 is an elevation of a portion of the kiln illustrating a second modification of the heating system; and Fig. 15 is a section on the line 15—15 of Fig. 14.

In the drawings, and referring first to the form of construction shown in Figs. 1 to 7, I have shown apparatus for treating briquettes comprising two kiln chambers or kiln sections A and B, and a connecting section C through which the briquettes treated are transferred from the kiln section A to the kiln section B. The briquettes treated are carried into the kiln section A at the end of the latter remote from the section C, and are moved through the kiln section A by a belt conveyor E, and are moved through the kiln section B by a conveyor $e$, and are discharged from the latter onto a conveyor belt D which removes the briquettes from the apparatus with which the present invention is concerned.

The conveyor E is a belt conveyor comprising trays or pans $E'$ linked together, and track rail engaging rollers $E^3$, and may be of any usual or suitable construction except that the bottoms $E^2$ of the pans $E'$ are perforated or formed of wire mesh to permit a free circulation of the kiln atmosphere therethrough. The rollers $E^3$ of the belt conveyor E run in one direction along upper track rails F, and run in the opposite direction along lower track rails $F'$, and pass about suitable guide rolls $E^4$ adjacent the transfer section C, and about guide rolls $E^5$ at the entrance end of the kiln. The guide rolls $E^5$ are located at some distance in front of the entrance end of the kiln section A to facilitate the loading of the briquettes onto the pans $E'$ before the latter enter the kiln section A. As shown in Fig. 2a, the briquettes are passed onto the conveyor E directly from the extrusion machine X in which they are formed by compressing the material out of which they are formed into cylinders which are served to form briquettes of suitable length as they leave the extruding press. The severed briquettes pass onto a feed belt $X'$ operated at a suitable speed to separate the adjacent sections of each cylinder from its neighbors. At the discharge end of the feed belt $X'$, the briquettes fall onto an inclined chute or slide $X^2$ along which they slide onto the subjacent portion of the conveyor E.

Within the kiln section A the upper or briquette transporting portion of the conveyor E passes along and immediately above the heating flue or combustion space by which heat is wholly or mainly supplied to the kiln section A. This space, as shown, is divided by a partition $G'$ into two side by side chambers or flues G which run the full length of the kiln section A and are in free communication with one another at distributed points along their lengths by means of ports $G^2$ in the partition wall $G'$. The top walls of the flues or chambers G are formed by plate-like bodies $G^4$, which may advantageously be made of cast iron, except where the temperature within the combustion chamber space is high enough to make the use of more refractory material desirable, in which case the plates $G^4$ may be made of heat resisting alloys, carborundum, or other suitable refractories. The bottom walls of the flues G are formed of refractory material and are carried by metal beams H extending transversely across the kiln structure and also supporting or assisting in supporting the walls of the combustion chambers G as a whole.

The combustion chamber structure as a whole forms a horizontal partition dividing the interior of the kiln A into an upper section $A'$ containing the track rails F, and the upper run of the conveyor belt, and a lower compartment $A^2$ containing the track rails $F'$ and the lower run of the conveyor E. At the entrance end of the kiln section A, the compartment $A^2$ is shaped to provide an oil holding basin $A^3$ through which the outgoing portion of the conveyor E passes, and into which a baffle $A^4$ extends to prevent the entrance of air into the compartment $A^2$.

The kiln chamber B may be, and as shown is similar in general construction and arrangement to the kiln chamber A, being divided into lower and upper compartments $B'$ and $B^2$, respectively, by a combustion chamber structure supported on transverse beams H and comprising separate longitudinal flues or combustion chambers $g$ like the flues or chambers G first described and having similarly formed walls. The conveyor $e$ for moving the briquettes treated through the compartment $B'$ of the kiln section B, may be similar in general construction and in its mode of mounting to the conveyor E first described, but the bottom walls $E^{20}$ of the different tray sections of the conveyor $e$ may be imperforate. Except as already indicated, corresponding structural parts of the two kiln sections A and B and of the conveyors E and $e$ and their mountings are designated by the same reference symbols. Advantageously, each of the conveyors E and $e$ is provided at suitable intervals along its under or inner side with transverse members $E^{15}$ which form baffles restricting circulation of the kiln atmosphere longitudinally through the space between the corresponding combustion chambers and the portion of the conveyor above said chambers, and which also serve as scrapers to move dust or other debris which may collect on the top walls of the combustion chambers, to the ends of the corresponding kiln chambers.

$E^{10}$ and $E^{21}$ represent dust pockets arranged to receive the dust swept from the corresponding combustion chambers by the members $E^{15}$ of the conveyors E and $e$, respectively. The dust accumulating in the pockets $E^{10}$ and $E^{21}$ may be removed from time to time through openings formed in the side wall of the kiln structure.

The transfer section C comprises provisions for transferring material moved through the kiln chamber A by the conveyor E, into the adjacent end of the conveyor $e$. For treating coal amalgam blocks or briquettes, it is desirable to prevent any appreciable gas flow between the kiln sections A and B through the transfer section C. As shown, the uprising buckets $C^4$ of a vertically disposed conveyor belt $C'$ running over upper and lower pulleys $C^2$ and $C^3$, respectively, receives the briquettes discharged from the adjacent end of the conveyor E through a suitable chute $C^5$. At the upper end of the conveyor $C'$ the briquettes are discharged from the buckets $C^4$ into a chute or hopper $C^7$ through a guide chute $C^6$. The chute or hopper $C^7$ may discharge directly onto the adjacent end of the upper run of the conveyor $e$ when the conditions of operation, and in particular the atmospheric pressures in the kiln sections A and B are such that the accumulation of briquettes in the hopper $C^7$ serves as an effective barrier against gas flow between the interiors of the kilns A and B. For the purpose of providing a more effective barrier against such gas flow, the hopper $C^7$, in the construction illustrated, discharges through a bottom outlet into an intermediate hopper $C^8$ having a bottom outlet opening into a guide chute or hopper $C^9$ through which the briquettes pass onto the conveyor $e$. The bottom discharge outlets of the hoppers $C^7$ and $C^8$ are controlled by bells or valves $C^{10}$ and $C^{11}$, respectively, which may be independently actuated so that one at least of these valves may always be closed. The actuating provisions for the valve $C^{10}$ shown comprise a steam cylinder $C^{12}$ having its piston rod connected through a lever $C^{13}$ to the stem of the valve $C^{10}$. The valve $C^{11}$ is similarly operated by a steam cylinder $C^{14}$ and connections including a lever $C^{15}$. The transfer section C comprises a housing wall which like the housing walls of the kiln sections A and B is preferably insulated to reduce heat radiation losses.

The provisions shown for supplying heat to the kiln chambers A and B comprises suitably distributed burner openings $G^{10}$ in the outer side walls of the combustion chambers $g$ and G. The burner openings may serve for the introduction of liquid or gaseous fuel and air for its combustion or burning gases from external fire boxes in any of the various ways employed in heating ordinary open fire tunnel kilns, or in supplying fuel and air for its combustion to ordinary muffle or combustion chamber heated kilns, and in consequence I have thought it unnecessary to illustrate any specific form of burner or fire box construction for supplying burning gases to the combustion chambers $g$ and G. Products of combustion pass from the ends of the combustion chambers $g$ adjacent the transfer section C, into the adjacent ends of the combustion chambers G through channels J which communicate at their ends with the chambers $g$ and G through ports $J'$ and $J^2$, respectively.

At the entrance end of the kiln section A products of combustion are withdrawn from the corresponding ends of the combustion chambers G by an exhaust fan K having its inlet connected to the chambers G through parts $K'$ and having a valved connection from its outlet to a stack $K^2$.

In addition to the heating means described, provisions may be made for passing products of combustion withdrawn from the combustion chambers G by the fan K back into the kiln compartment $A'$ to ports $A^5$ located at some distance from the entrance end of the kiln section. $K^3$ represents a valved connection from the outlet of the fan K to the ports $A^5$ for this purpose. When hot products of combustion are thus introduced into the compartment $A'$, they assist in initially heating the briquettes, and in eliminating from the latter the water originally contained therein.

In the use of the apparatus disclosed in the preparation of fuel in the manner previously described, the plastic briquettes Y preferably of cylindrical form are piled to the proper height on the successive tray sections of the conveyor E, as those sections successively pass beneath the chute $X^2$ preparatory to their reentrance into the kiln section A. As the fuel blocks pass through the kiln section A they are gradually heated and dried, and are subjected to such an oxidizing action, that by the time they are discharged into the chute $C^5$ they are at a temperature of about 450° F., and are then hard and strong enough to permit of their transportation without objectionable breakage or breeze formation.

As the briquettes are thus heated up in the compartment $A'$ volatile matter is driven out of the briquettes. The volatile matter thus driven out of the briquettes in the initial portion of the compartment $A'$ is wholly or mainly water vapor which may be allowed to escape to waste through suitable outlets $m$ formed in the roof of the corresponding portion of the compartment. As the heating proceeds, oil vapors are expelled from the briquettes. At first the oil vapors expelled are mainly the lighter or more volatile constituents of the oil mixture employed in forming the coal amalgam, but in the final stage of the treatment in the kiln section A, some of the heavier or less volatile constituents of the amalgam forming oils, and in some cases volatile constituents of the coal used are expelled. The oil vapors and gases driven out of the briquettes escape from the compartment $A'$ through outlets $ma$ opening from the roof of the compartment $A'$ along an intermediate portion of the length of the latter, and through pipes M opening through the roof of the compartment at intervals along the length of the portion thereof adjacent the transfer section C. The outlets $ma$ and M may be connected to condensing apparatus for recovering and utilizing the vapors and gases escaping from the kiln through these outlets.

To accelerate the heating and oxidizing actions, as well as to minimize the amount of atmospheric air required as an oxidizing agent, provisions are made for effecting an energetic circulation of the kiln atmosphere in the high temperature end of the compartment $A'$. The provisions shown for this purpose comprise a circulating fan N having its inlet connected by a collecting pipe $M'$ to the various gas outlets M, and having its outlet connected by a distributing pipe $L'$ to gas inlets L. Surrounding the pipes L, $L'$, M and $M'$ is a longitudinally extending casing $L^{10}$ supported on the kiln top and carrying transverse supporting elements $L^{20}$ and $L^{30}$ for supporting the pipes $L'$ and $M'$, respectively.

The gas outlets M are shown as arranged in a central row running along the length of the kiln chamber, while the inlets L are arranged in pairs with one inlet of each pair at each side of the central row of outlets M. The individual outlets M, and the pairs of inlets L, are alternately spaced along the length of the kiln. To better distribute the air and gas mixture over the brisuettes, the inlets L terminate in expanding nozzles or hoods $L^2$, and the inlets L at each side of the row of outlets M are arranged alternately nearer to and farther away from said row as indicated in Fig. 5. Advantageously each of the inlets L and each of the outlets M, $ma$, and $m$ is provided with an individual throttling damper or blast gate O.

As the kiln atmosphere in the high temperature end of the compartment $A'$ is recirculated, the air required for the production of the necessary oxidizing effect is drawn from the external atmosphere into the circulating system through a valve controlled inlet $N'$ to the fan N, and a portion of the circulating air, gas, and vapor mixture is discharged from the circulating system. This discharge may take place through a valve controlled outlet $L^5$ or through a valve controlled outlet $M^5$. The discharge connection $M^5$, which is connected to the pipe $M'$, is employed when the vacuum in the condensing apparatus Z for recovering the valuable constituents of the vapors discharged is operated under sufficient vacuum to draw the proper gas and vapor mixture out of the pipe $M'$. When the condenser vacuum maintained is not sufficiently great, the vapors pass to the condensing apparatus through the outlet $L^5$. The discharge to the condenser through the outlet $M^5$ when possible is preferable, of course, because the vapors discharged through that outlet are less diluted with air than are the vapors discharged through the outlet $L^5$. The vapor outlets $ma$ from the intermediate portion of the compartment $A'$ may be connected through a collecting pipe $ma'$ to the condensing apparatus Z receiving the discharge through the outlets M⁵ and L⁵.

Preferably the various dampers are so adjusted as to maintain a pressure in the compartment A' approximately equal to that of the atmosphere to minimize the tendency of the air to leak into, or gas to leak out of the compartment A'. To minimize longitudinal circulation of the kiln atmosphere in the portion of the compartment A' above the conveyor E and the briquettes Y on the latter, the compartment A' is advantageously provided with depending roof baffles P which extend transversely across the kiln chamber and are arranged as shown one between each gas outlet M and each adjacent pair of gas inlets L. The baffles P may each consist of a cast iron plate the upper edge of which is received in a corresponding kerf A'' in the roof or top wall of the compartment A'. Advantageously the lower edges of the baffles P are shaped to the contour of the conveyor and the mass of briquettes stacked thereon, and are made vertically adjustable so that they may be raised and lowered to provide just sufficient clearance between the lower edges of the baffles and the briquettes passing under them as the height to which the briquettes are piled on the conveyor E is varied. As shown, the baffles P are supported with provisions for vertical adjustments by means of hanger bolts P' attached to the baffles P and passing through the metallic cover or roof plate on the compartment A', and having nuts threaded on their external portions.

The gases and vapors driven out of the fuel in the compartment B' are withdrawn through outlets T each provided with a controlling damper T⁴ and each connected to a gas collecting main T⁵ which ordinarily leads to suitable apparatus such as the condenser Z, or as shown, a separate condenser ZA for cooling the gases and vapors and recovering their valuable constituents. The cooled permanent gases having calorific value, if any such are recovered, and the oil condensates recovered in the condensers Z and ZA may well be used as fuel in the combustion chambers g and G.

The hardening and toughening of the briquettes obtained by heating them to a temperature of about 450° F. while exposed to an oxygen-containing atmosphere, is wholly or mainly due to the oxidization of heavier or less volatile constituents of the oil in the oil amalgam and is more or less of a surface action. With briquettes of ordinary size it is sufficient to thus oxidize a shell portion of the briquette one-eighth of an inch thick or so. The oil oxidizing action proceeds quite rapidly after the briquettes are sufficiently heated and the briquettes are freed from the lighter more volatile amalgam oil constituents which when present in the briquettes seem to inhibit the oxidizing action. If, as contemplated, the briquettes are loosely piled one on top of another on the pans E' to form a layer several briquettes deep, the surfaces of contact between the different briquettes do not become oxidized, but as the oxidizing action proceeds rapidly when the proper conditions are attained an appreciable and desirable oxidization of the surface portions not previously oxidized occurs when the original piling of the briquettes is disturbed as the latter are discharged from the conveyor E and are moved by the conveyor C' through the transfer section C. The oxidization then occurring, even though relatively small in amount, may contribute materially to the avoidance of breeze formation in the subsequent handling of the briquettes.

If the apparatus shown is operated, as it may be, to oxidize briquettes in the kiln sections A and C sufficiently to enable the briquettes to stand handling and transportation, the briquettes as discharged by the conveyor C' form a satisfactory fuel for many purposes. Where smokeless combustion is desired, however, the briquettes are advantageously subjected to a further treatment at a higher temperature in the kiln section B.

When the kiln section B is utilized in eliminating volatile smoke forming constituents from the briquettes, the latter are heated in the kiln B to a temperature of something like 800° F. or higher when treating briquettes made from bituminous coals containing substantial amounts of volatile elements. Since at this temperature the fuel itself will burn and the vapors expelled from the briquettes are highly inflammable and at a temperature appreciably higher than their ignition temperature, especial care must be exercised to prevent the admission of air to the kiln section B. The introduction of air into the kiln section B from the kiln section A through the transfer section C may be prevented by provisions of the character previously described. In the form of construction shown in Figs. 1 and 2, the introduction of air into the kiln section B at the exit end of the latter is prevented by providing a quenching bath for the discharged briquettes which also serves as a means for forming a water-seal preventing the admission of air into the kiln section B. The quenching and sealing water is held in a basin S into which the lower end of the conveyor D extends, and into which the briquettes discharged by the conveyor e slide along an inclined chute d. B¹⁰ represents an extension of the end wall of the kiln section B dipping down into the quenching liquid far enough to form an effective water-seal, but not far enough to interfere with the passage of the briquettes along the chute d into the buckets of the conveyor D. Additional quenching means for the briquettes may be provided in the form of a spray pipe SA extending through the end wall of the kiln section B and discharging a water spray onto the briquettes as they pass along the chute d. The steam formed by the evaporation of the quenching water supplied by the pipe SA may escape from the kiln section B through the damper controlled outlet t.

It may be noted that the Rhode Island anthracite coal mentioned above is graphitic in character and contains practically no volatile matter, but the invention may be used in forming briquettes out of other materials as bituminous coal dust, or the char formed in the low temperature carbonization of coal, and in some cases some of the low volatile constituents of the carbonaceous material used in forming the briquettes will be driven out of the latter in the high temperature end of the compartment A' and more will be expelled in the kiln section B.

To avoid injurious consequences from gas explosions which may occur from time to time in the kiln sections A and B, the latter are advantageously provided with distributed openings R in the side walls which are normally closed by outwardly opening explosion doors R'. To guard against injurious consequences from the ignition of the briquettes in the kiln which may occasionally occur, valved steam supply connections Q are provided by which steam or some other fire extinguishing fluid may be injected into the kiln at the proper point or points. Precautions against the ignition of the briquettes and vapors driven out of the latter are especially important in the case of the high temperature end of the kiln section A because of the oxygen content and active circulation of the atmosphere therein. For this reason provisions may advantageously be made for injecting steam into the circulating system on any predetermined rise in temperature therein. To this end a steam connection $Q'$ is made to the inlet of the fan N and is provided with an automatic valve $Q^2$ controlled by a thermostat $Q^3$ in the pipe $M'$ which is adjusted to open and close the valve $Q^2$ as the temperature in the pipe $M'$ rises above and falls to or below a predetermined temperature.

It will be apparent to those skilled in the art that various changes in the forms of constructions and modes of use previously described may be made without departing from the general principles of my invention. For example, a kiln as shown in Figs. 1 and 2 may be used as previously described to complete the oxidization of the briquette oil constituents necessary to toughen and harden the briquettes in the kiln sections A and C, while the kiln section B is used for the elimination of smoke forming constituents. If the elimination from the briquettes of smoke forming constituents is not important, the capacity of the kiln may be increased by using the kiln section B to complete the briquette drying and hardening operations initiated in the kiln section A.

In lieu of the provisions shown in Figs. 1 and 2 for providing a steam barrier the passage of air into the kiln chamber B at its discharge end, the fuel may be discharged through hoppers $U^7$, $U^8$ and $U^9$ similar to the hoppers $C^7$, $C^8$ and $C^9$ shown in the transfer section C and provided with similar discharge valves or bells $U^{10}$ and $U^{11}$ and the apparatus sealed by a projecting part of the wall B contacting with the hopper $U^7$.

While, generally speaking, it is desirable, for reasons already explained, to disturb the original placement of the briquettes on the conveyor on which they are moved through the initial oxidizing portion of the kiln to permit of some oxidation of the surfaces of the briquettes in contact in their original placement, this result does not necessarily require the use of a separate conveyor $C'$ in the transfer section C. On the contrary, as shown in Fig. 10, the discharge end of the conveyor E may be extended upwardly by means of a suitably disposed guide roll $E^6$ and guide rails $E^7$ so that the briquettes discharged from the conveyor E will fall into a hopper $C^{80}$ having its discharge end located above the conveyor $e$. The same result can be obtained in a somewhat simpler manner as shown in Fig. 11, when conditions make it practically feasible to locate the conveyor $e$ at a level sufficiently below that of the conveyor E to enable the conveyor E to discharge into the hopper $C^{80}$ without any elevation of the discharge end of the conveyor E.

With the recirculation of the atmosphere of the briquette drying and hardening kiln section A provided for as previously described, it is possible to supply some or all of the heat requirements of the kiln section A by adding heat externally of the kiln to the air and gas mixture returned to the kiln. One arrangement for thus supplying some or all of the heat required in the section A is illustrated in Figs. 12 and 13. To facilitate regulation of the amounts of heat supplied to different longitudinal portions of the kiln, the kiln atmosphere circulating provisions are conveniently divided into sections longitudinally of the kiln. As shown in Figs. 12 and 13, there are two such circulating sections, $MA'$ representing the gas off-take pipe for the high temperature end of the kiln section A, and $MA^2$ representing the gas off-take pipe for an intermediate portion of the length of the kiln section A. The off-take pipes $MA'$ and $MA^2$ are connected to the kiln chamber at distributed points along the length of the latter by connections M which may be formed and disposed generally as shown in Figs. 5 and 6. Associated with the off-take pipes $MA'$ and $MA^2$ are air and gas return pipes $LA'$ and $LA^2$ which may be connected to the kiln chamber by connections L constructed and disposed generally as are the connections shown in Figs. 5 and 6. As diagrammatically shown in Fig. 12, the pipes $LA'$ and $LA^2$ are arranged alongside the pipes $MA'$ and $MA^2$, respectively, though they may be located above the latter, as the pipe $L'$ is shown above the pipe $M'$ in Figs. 5 and 6.

The pipe $MA'$ is connected at one end to the inlet of a fan $NA'$, the outlet $N^{10}$ of which opens to an air or gas heater $T'$. The latter as somewhat conventionally and diagrammatically illustrated in Fig. 13 comprises a bank of tubes $T^{10}$ connected at one end to a header or chamber $T^{11}$ into which the outlet $N^{10}$ of the fan $NA'$ discharges. At their opposite ends the tubes $T^{10}$ are connected to a header or chamber $T^{12}$ to which the corresponding end of the pipe $LA'$ is connected. The air and gas mixture passing through the pipes or flues $T^{10}$ are heated by products of combustion passing to the heater stack outlet $T^{13}$ from a combustion chamber $T^{14}$ in which any suitable fuel may be burned. As shown, $T^{15}$ represents a burner pipe for supplying fluid fuel to the combustion chamber $T^{14}$. More or less air may be mixed with the gases passed into the heater $T'$ to be heated therein, as by means of the valved inlet $N'$ to the fan $NA'$. Excess gas is discharged from the circulating system to the condenser (not shown) as in the construction first described, by means of a suitable valve outlet $L^5$.

The pipes $MA^2$ and $LA^2$ are each connected through a fan $NA^2$ and heater $T^2$ which may be similar, respectively, to the fan $NA'$ and heater $T'$. $L^6$ represents a valved outlet for discharging excess gas to the gas condenser (not shown), as it is discharged from the high temperature circulating section through the pipe $L^5$. As shown in Figs. 12 and 13, the off-take pipe $MA^2$ and the connection M from the latter to the kiln replace the gas outlets $ma$ of Figs. 1 and 2.

As shown in Figs. 12 and 13, the entrance end portion of the kiln section A is heated in whole or in part by the products of combustion from the heaters $T'$ and $T^2$ drawn from the stack outlet connections $T^{13}$ thereof by the exhaust fan NB, the outlet pipe $T^{16}$ of which is connected to the kiln inlets $A^5$. Except as above described, the kiln construction shown in Figs. 12 and 13 may be identical with that shown in Figs. 1 and 2, in which case it is possible to supply the heat requirements of the kiln section A wholly by means of the heaters $T'$ and $T^2$, or wholly by the use of the combustion chambers G, or partly by the use of the latter and partly by the use of the heaters $T'$ and $T^2$. The heaters $T'$ and $T^2$ are efficient and easily operated and regulated. The division of the kiln atmosphere circulating system into two or more sections connected to different longitudinal portions of the kiln, and each with its independent heater, facilitates a very accurate control of the rate of heat supplied to each of the corresponding longitudinal portions of the kiln.

In lieu of separate fuel burning means for heating the circulating gases externally of the kiln chamber, those gases may be heated in a suitable external heat exchanger or exchangers in which heat is absorbed by the circulating kiln atmosphere from any suitable or available waste heat gas source. For example, as shown in Figs. 14 and 15, the circulating gases may thus be heated by the products of combustion withdrawn from the combustion chamber of the smoke eliminating section B of the treating kiln when the latter comprises such a section. As shown in Figs. 14 and 15, the heating gases coming from the high temperature or smoke eliminating section of the kiln through the passages J are delivered by the latter through branches U' to a pipe U which is axially disposed in the pipe LB. The latter replaces the pipe L of Figs. 1 and 2, and the pipes LA' and LA² of Figs. 12 and 13. The annular space between the pipe U and the pipe LB is connected to the kiln chamber A by regulable pipes L¹⁰, and the off-take pipe MB of the kiln atmosphere circulating system is connected to the kiln section A by distributed and regulable connections M¹⁰. The connections L¹⁰ and M¹⁰ may be similar in disposition and form to the connections L and M previously described except as their form is changed as the result of the fact that the pipe MB is conveniently located above the pipe LB.

When the heat requirements of the kiln are intended to be wholly supplied by external heating provisions, the combustion chambers of the kiln A shown in Figs. 1 to 4 are unnecessary, and may be replaced by a simple partition A¹⁰ as shown in Fig. 15, although even such a partition is not always required. The elimination of the internal combustion chambers made possible by the use of means for externally heating the circulating kiln atmosphere obviously reduces the vertical dimensions and cheapens the construction cost of the kiln structure proper.

The novel method of preparing fuel disclosed, but not claimed herein, is claimed in my prior patent 1,812,432, granted June 30, 1931, on my application, of which this application is a division.

Having now described my invention what I claim as new and desire to secure by Letters Patent is:

1. A kiln for heat treating material comprising an elongated kiln chamber, an elongated heating chamber dividing said kiln chamber into upper and lower compartments, means for passing heating gases longitudinally through said heating chamber, tracks mounted in said compartments, an endless conveyor formed in sections mounted on said tracks and movable in one direction through said upper compartment and in an opposite direction through said lower compartment, and means for withdrawing gases from and returning gases to longitudinally spaced portions of said upper compartment.

2. A kiln having a horizontally elongated chamber divided into upper and lower compartments by an intervening hollow wall providing a combustion space extending longitudinally of the chamber, an endless belt conveyor surrounding and spaced from said hollow wall and rotatable in a vertical plane in one direction through the upper of said compartments and in the opposite direction through the lower of said compartments, and means for restricting the flow of gases longitudinally through said chamber including transversely extending roof baffles positioned at longitudinally spaced points in said upper compartment, and scraper baffles carried by said conveyor at longitudinally spaced points thereof in position to depend from the underside of the portion of the conveyor within said upper compartment.

3. A kiln for drying and hardening plastic bodies of oil wet fine coal, comprising a horizontally elongated kiln chamber, muffle heating means arranged longitudinally in said chamber, means for continuously moving said bodies through said chamber, distributed gas inlets to and outlets from said chamber, a fan having its inlet connected to said outlets and its outlet connected to said inlets and forming a closed system for recirculating the kiln atmosphere, and means for minimizing combustion in said chamber including steam supply means and thermostatic means for regulating the supply of steam to said recirculation system in accordance with the temperature of the gases passing out of said chamber through said gas outlets.

4. A kiln for drying and hardening plastic bodies of oil wet fine coal, comprising a horizontally elongated kiln chamber, muffle heating means therein for heating said bodies, conveying means for moving said bodies through said chamber, distributed gas inlets to and outlets from one portion only of said chamber, a fan having its inlet connected to said outlets and its outlet connected to said inlets to form a closed system for recirculating the kiln atmosphere in said chamber portion, and means for adding air to and withdrawing gases from said system.

5. In a kiln for heat treating fuel, the combination with a horizontally elongated kiln chamber having a high temperature end portion and another portion in which a relatively low temperature is maintained, of muffle heating means in said chamber, means for moving the fuel being treated through said chamber, means for effecting a positive circulation of the chamber atmosphere in the high temperature end portion of said chamber comprising gas inlet and outlet ports opening to said chamber end portion only, a circulating fan located externally of said chamber and having its inlet connected to said outlet ports and its outlet connected to said inlet ports, a condenser, means for passing a portion of the gases withdrawn through said outlet ports to said condenser, and conduit means connecting said condenser to a portion of said chamber in which is maintained a temperature lower than in said high temperature end portion.

6. A kiln having a horizontally elongated chamber divided into upper and lower compartments by an intervening hollow wall providing a combustion space extending longitudinally thereof, an endless belt conveyor surrounding said hollow wall and rotatable in a vertical plane longitudinally of the chamber in one direction through the upper of said compartments and in the opposite direction through the lower of said compartments, said conveyor being pervious to effect the circulation of the kiln atmosphere therethrough, and means for positively circulating the kiln atmosphere in one portion of said chamber comprising gas inlets and gas outlets arranged in the upper wall of said upper compartment and distributed alternately along a substantial portion of the length thereof, and a circulating fan connected to said gas inlets and outlets.

7. A kiln comprising a low temperature section, an intermediate transfer section, and a high temperature section said low and high temperature sections extending horizontally in opposite directions away from said intermediate section, means for heating said low and high temperature sections, a belt conveyor arranged to move material being treated through said low temperature section to said transfer section, a second belt conveyor arranged to receive said material from said transfer section and move it through said high temperature section, and conveying mechanism in said transfer section arranged to receive said material from said first mentioned conveyor and dispose it in a new position on said second mentioned conveyor, and gas sealing means in said transfer section arranged to restrict atmospheric flow between said low and high temperature sections.

PHILIP D' HUC DRESSLER.